July 1, 1952    F. REINGRUBER ET AL    2,602,128
THERMOSTATIC SWITCH

Original Filed Oct. 26, 1945

INVENTORS
FRANK REINGRUBER
JOSEPH REINGRUBER
BY
ATTORNEY

Patented July 1, 1952

2,602,128

UNITED STATES PATENT OFFICE 2,602,128

THERMOSTATIC SWITCH

Frank Reingruber, Yonkers, and Joseph Reingruber, Astoria, N. Y.

Original application October 26, 1945, Serial No. 624,674, now Patent No. 2,584,924, dated February 5, 1952. Divided and this application January 5, 1952, Serial No. 265,145

4 Claims. (Cl. 200—137)

This invention relates to thermostats and more particularly to that type in which is employed two metals of dissimilar heat expansion characteristic to actuate a control, whether an electric switch, relay valve or the like, and is a division of our application Serial No. 624,674, filed October 26, 1945, Patent No. 2,584,924, granted Feb. 5, 1952.

Our invention contemplates the provision of a comparatively sensitive thermostat so designed and constructed that the relatively small movement of the expanding metal is translated into a larger, multiplied or magnified movement of the control operating element and therefore provides a thermostat that reacts rapidly to relatively small changes in temperature.

Our invention further contemplates a thermostat of such construction that it may be readily applied in direct contact with the device to the temperature of which the thermostat is designed to react, and thereby one adapted to quickly react to relatively small changes in temperature thereof, thereby increasing the sensitivity of regulation and limiting the tendency of the device to overshoot the temperature for which the thermostat is set.

Our invention still further contemplates the provision of a thermostat which is simple and rugged in construction, self-contained in a casing that may be conveniently applied as a unit to the article, the temperature of which is to be regulated.

Our invention also contemplates the provision of such a thermostatic unit that is relatively small in size and compact, reliable in operation and readily adjustable.

Other and further objects and advantages of the present invention and the uses to which it may be put, as well as the devices to which it may be applied, will be clear from the description which follows and the drawing appended thereto, in which.

Figure 1:
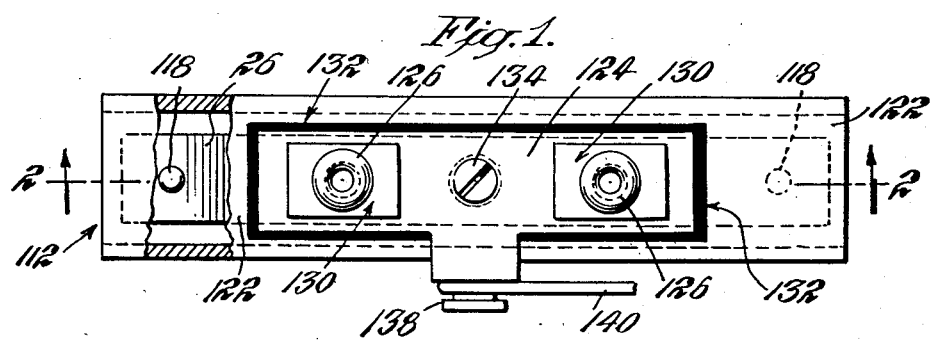
Fig. 1 is a part sectional plan view of a thermostat unit according to our invention.
Figure 2:
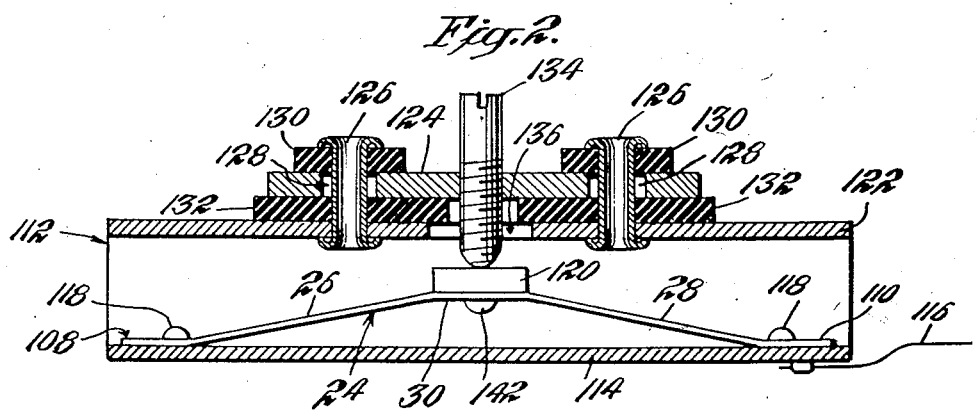
Fig. 2 is a longitudinal sectional view of the same on substantially the plane of line 2—2 of Fig. 1.

Referring now to the drawing, we have there illustrated a modification of our invention which is particularly adapted for use with a low temperature device, such as an electric heating pad.

In this modification the parts of the thermostat are housed in the casing 112, which itself serves as one electrode and therefore has secured to one side 114 thereof the lead wire 116.

The housing or casing 112 constitutes the heat expanding member of this modification and is formed from a hollow bar, tube or rod of material having a relatively high coefficient of expansion.

The legs 26 and 28 of the flexible or collapsible member 24 are secured in the interior of the casing 112, as by welds 118, at the toes 108 and 110 thereof, to the inside surface of wall 114.

The member 24 has a relatively low coefficient of expansion and is made of metal which is an electrical conductor, such as spring steel, and has secured to the platform-like element 30 at its midpoint, the electrical contact 120 which serves as the movable terminal of the switch means.

On the exterior of the casing 112, at an opposite wall 122, we secure the contact bracket 124 by any suitable means such as the staples 126, which extend into the openings 128 in the contact bracket 124 and are peened over the insulating washers 130 to grip the various parts in place.

The contact bracket 124 is insulated from the casing 112 by the mica sheets 130 and 132, held in place by the staples 126.

The contact bracket 124 is provided with a tapped aperture in which the calibrating screw 134, constituting the other fixed terminal of the switch means, is received so that it extends through the opening 136 in the wall 122, in contact with and against the electrical contact 120.

Extending from the bracket 124, as an integral part thereof, we provide the terminal binding post 138 to which the lead wire 140 is secured.

The electrical circuit is therefore from the source (not shown) through the lead wire 116, the casing 112, contact 120, calibrating screw 134, bracket binding post 138 and through the lead wire 140 to the source.

The electrical contact 120, which is pulled away from the calibrating screw 134 upon heat expansion of the casing 112, returning in contact therewith upon contraction of the casing, constitutes together with the screw 134 the make and break switch which is controlled by the expanding and positively moved members of the temperature responsive mechanism.

In the embodiment illustrated the expanding member constitutes the casing and the flexed member constitutes with the calibrating member, the make and break switch.

The relative dimensions of the various elements of the temperature responsive mechanism used with our invention will vary in practice.

The platform is preferably considerably smaller than the two legs and the angle where they meet it or each other the toes should not be rounded but relatively sharp, as illustrated, which construction we have found results in the relatively large downward movement sought at the center of the spaced member for a given expansion of the other member and the concavo-convex flexing of the legs, which also adds to accomplishment of this result.

It will be seen that we have provided a sensitive thermostat in which a relatively small linear movement of a heat expanded member is translated into a comparatively greater, multiplied or magnified movement of the member controlling the operation of the device.

It is further apparent that we have provided a thermostat in which the temperature responsive mechanism comprises a member that readily expands or contracts under the influence of changes in temperature to flex a second member which is spaced from it except at its ends, to thereby operate a control.

It is still further apparent that we have provided a simple, rugged, self-contained, compact and relatively small thermostat that is reliable in operation and readily adjustable.

While we have illustrated a specific embodiment of our invention, we do not intend to be limited to the specific details shown, but intend to claim our invention as broadly as the prior art and the scope of the appended claims permit.

What is claimed is:

1. A thermostat for making and breaking an electric current comprising a hollow bar of material having a relatively high coefficient of expansion and being a conductor of electricity, said bar constituting an electrode, a spring member arranged in the interior of the bar, said spring member being of a material having a relatively low coefficient of expansion and being a conductor of electricity, said spring member bent at its center to form a platform spaced from a first inner wall of the bar opposite thereto and normally straight legs diverging from the platform to said first inner wall, said legs at their ends secured to the said first inner wall and a second electrode extending through a second inner wall of the hollow bar and electrically insulated therefrom in normal contact with said platform.

2. The thermostat of claim 1, said second electrode having a screw-threaded mounting on said second inner wall of the hollow bar for selective adjustable positioning relative to the platform.

3. The thermostat of claim 1 and including an electrical contact on the platform intermediate the platform and the second electrode and normally in contact therewith.

4. A thermostat for making and breaking an electric current comprising a hollow bar of material having a relative high coefficient of expansion, a spring member arranged in the interior of said bar, said spring member being of a material having a relatively low coefficient of expansion, said spring member bent at its center to form a portion spaced from a first inner wall of the bar opposite thereto and normally straight legs diverging from said portion to said first inner wall, said normally straight legs being secured at their ends to said first inner wall and switch means operable by said spring member and disposed between said spaced center portion of said spring member and a second inner wall of the hollow bar opposite thereto.

FRANK REINGRUBER.
JOSEPH REINGRUBER.

No references cited.